US012770981B2

(12) United States Patent
Park et al.

(10) Patent No.: US 12,770,981 B2
(45) Date of Patent: Oct. 20, 2026

(54) BATTERY MODULE

(71) Applicant: HYUNDAI MOBIS CO., LTD., Seoul (KR)

(72) Inventors: Yun Su Park, Yongin-si (KR); Ki Hyeon Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 590 days.

(21) Appl. No.: 18/087,245

(22) Filed: Dec. 22, 2022

(65) Prior Publication Data

US 2023/0261329 A1 Aug. 17, 2023

(30) Foreign Application Priority Data

Feb. 17, 2022 (KR) ........................ 10-2022-0020944
Feb. 17, 2022 (KR) ........................ 10-2022-0020945
Feb. 17, 2022 (KR) ........................ 10-2022-0020946

(51) Int. Cl.
*H01M 50/505* (2021.01)
*H01M 10/48* (2006.01)
(Continued)

(52) U.S. Cl.
CPC ....... *H01M 50/505* (2021.01); *H01M 10/486* (2013.01); *H01M 10/613* (2015.04);
(Continued)

(58) Field of Classification Search
CPC .. H01M 50/264; H01M 50/30; H01M 50/505; H01M 10/48; H01M 10/486; H01M 10/613; H01M 10/6556
(Continued)

(56) References Cited

U.S. PATENT DOCUMENTS

2016/0380319 A1* 12/2016 Rhein et al. ........ H01M 50/569 429/90
2020/0083502 A1 3/2020 Fan et al.

FOREIGN PATENT DOCUMENTS

CN 110323362 A 10/2019
CN 209843793 U 12/2019
(Continued)

OTHER PUBLICATIONS

Wei, Zhongbao, et al. "Future smart battery and management: Advanced sensing from external to embedded multi-dimensional measurement." Journal of Power Sources 489 (Jan. 2021): 229462, (25 pages).

(Continued)

*Primary Examiner* — Kevin P Kerns
(74) *Attorney, Agent, or Firm* — NSIP Law

(57) ABSTRACT

Disclosed is a battery module including a battery assembly, in which multiple batteries are stacked, and a bus bar housing assembly that surrounds an upper side of the battery assembly. The bus bar housing assembly may include a temperature sensing part including a temperature sensor that has a first fixing hole and measures temperature, and a voltage sensing part including a pressure sensor that has a second fixing hole and measures pressure. The battery module also included a bus bar coupled to the temperature sensing part and the voltage sensing part, and a bus bar housing, coupled to the bus bar, surrounding an upper surface of the battery assembly, and extending downwards from opposite ends in leftward and rightward directions to surround a side surface of the battery assembly.

12 Claims, 17 Drawing Sheets

(51) Int. Cl.

| | |
|---|---|
| ***H01M 10/613*** | (2014.01) |
| ***H01M 10/6556*** | (2014.01) |
| ***H01M 50/264*** | (2021.01) |
| ***H01M 50/30*** | (2021.01) |

(52) U.S. Cl.
CPC ..... *H01M 10/6556* (2015.04); *H01M 50/264* (2021.01); *H01M 50/30* (2021.01)

(58) Field of Classification Search
USPC .......................................................... 429/163
See application file for complete search history.

(56) References Cited

FOREIGN PATENT DOCUMENTS

| | | | |
|---|---|---|---|
| CN | 110911604 | A | 3/2020 |
| CN | 214411436 | U | 10/2021 |
| CN | 215496972 | U | 1/2022 |
| KR | 10-2015-0001604 | A | 1/2015 |
| KR | 10-2018-0020269 | A | 2/2018 |

OTHER PUBLICATIONS

Extended European search report issued on Aug. 1, 2023, in counterpart European Patent Application No. 22215995.6 (8 pages).
Korean Office Action Issued on Mar. 9, 2026, in Counterpart Korean Patent Application No. 10-2022-0020945 (8 Pages in English, 8 Pages in Korean).
Korean Office Action Issued on Mar. 9, 2026, in Counterpart Korean Patent Application No. 10-2022-0020946 (9 Pages in English, 9 Pages in Korean).
Korean Office Action issued on Sep. 7, 2026, in counterpart Korean Patent Application No. 10-2022-0020944 (7 pages in English, 7 pages in Korean).

* cited by examiner (a)

(b)

BATTERY MODULE

CROSS-REFERENCE TO RELATED APPLICATION

This application claims the benefit under 35 USC § 119(a) of Korean Patent Application Nos. 10-2022-0020944, 10-2022-0020945, and 10-2022-0020946, all filed in the Korean Intellectual Property Office on Feb. 17, 2022, the entire disclosures of which are hereby incorporated by reference for all purposes.

BACKGROUND

1. Field

The present disclosure relates to a battery module.

2. Description of Related Art

In recent years, secondary batteries have been commonly used for not only portable devices but also electric vehicles (EVs) or hybrid electric vehicles (HEVs) driven by electrical driving sources or energy storage systems (ESSs). Types of the secondary batteries include lithium ion batteries, lithium polymer batteries, nickel cadmium batteries, nickel hydrogen batteries, and nickel zinc batteries. An operation voltage of a unit secondary battery cell, that is, a unit battery cell is often approximately 2.5 V to 4.6 V.

Accordingly, when a higher output voltage is required, multiple battery cells are connected in series to each other to constitute a battery pack. Furthermore, the battery cells are connected in parallel to each other to constitute a battery pack according to a charging/discharging capacity required for the battery pack. Accordingly, the number of the battery cells included in the battery pack may be variously set according to an output voltage or a charging/discharging capacity.

When a battery pack is constituted by connecting multiple secondary battery cells in series/in parallel to each other, a predetermined number of secondary battery cells may constitute one battery module and one or more battery modules and other components are assembled to constitute the battery pack. Here, the secondary battery cells that constitute the battery module or the battery pack are general.

Meanwhile, heat is generated whiled the secondary battery repeats charging and discharging. Because the secondary batteries are concentrated in a narrow space of the battery module, temperature may significantly rise during an operation of the battery module. When a temperature of the battery module rises to more than a preset temperature, the performance of the battery module may be degraded, and there is a danger of the battery module being exploded or ignited in severe cases.

Accordingly, it is very important to secure a cooling means in constituting the battery module. Schemes for cooling a battery module may include two schemes of an air cooling scheme and a water cooling scheme. The air-cooling schemes are more widely used than water cooling schemes due to problems of a short circuit or waterproofing problems. However, in many cases, the air cooling type battery module has low energy density per unit volume due to the unit cells for securing air passages and the intervals between the unit cells. Additionally, when an impact or vibration is applied to the battery module, the unit cells are adhered to each other, and may be blocked while foreign substances may be introduced into the narrow passage decreasing structure stability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a battery module including a battery assembly, in which multiple batteries are stacked, and a bus bar housing assembly that surrounds an upper side of the battery assembly. The bus bar housing assembly may include a temperature sensing part including a temperature sensor that has a first fixing hole and measures temperature, and a voltage sensing part including a pressure sensor that has a second fixing hole and measures pressure. The battery module also included a bus bar coupled to the temperature sensing part and the voltage sensing part, and a bus bar housing, coupled to the bus bar, surrounding an upper surface of the battery assembly, and extending downwards from opposite ends in leftward and rightward directions to surround a side surface of the battery assembly.

The bus bar may include a bus bar body having a plate shape, a plurality of side end bending parts bent downwards from one end of the bus bar body in one of the leftward and rightward directions, and a connecting protrusion part, the temperature sensing part and the voltage sensing part being adhered to the connecting protrusion part, protruding inward from an opposite end of the bus bar body.

The bus bar housing may include a bus bar housing body, the bus bar coupled thereto, surrounding an upper surface of the battery assembly. The bus bar housing may also include bending parts accommodating part disposed at opposite ends of the bus bar housing body in the leftward and rightward directions, and in which the plurality of side end bending part is accommodated, and a hook part protruding upwards while being bent from a central portion of the bus bar housing body toward an end thereof in one of the leftward and rightward directions, and adhered to an upper surface and a side surface of the bus bar body.

The bus bar housing may further include a fixing boss protruding upwards from the bus bar housing body, which may be configured to be coupled to the first fixing hole of the temperature sensing part and the second fixing hole of the voltage sensing part, and a plurality of gas discharge holes provided in a central area in the one of the leftward and rightward directions on an upper side of the bus bar housing body to discharge a gas discharged from the battery assembly and formed in at least one of forward and rearward directions.

The voltage sensing part and the bus bar housing may be joined to each other through laser welding.

the bus bar housing may further include a partition wall protruding upwards from an end of the bus bar housing body.

The battery module may further include a pair of side plate assemblies, located at opposite ends of the battery assembly in forward and rearward directions, which are configured to press the battery assembly, and a band member that surrounds the pair of side plate assemblies and the battery assembly to fasten the battery assembly and the side plate assemblies.

The band member may include an upper band member configured to surround and fasten the battery assembly, the pair of side plate assemblies, and the bus bar housing assembly.

The side plate assemblies may include an outer member including an outer member body extending in the leftward and rightward directions, and a bending area, in which opposite ends of the outer member body in the forward and rearward directions are bent inwards in the forward and rearward directions. The outer member may include a first protruding area protruding outwards in an upper area of the outer member body, and a second protruding area spaced apart from the first protruding area downwards and protruding outwards. The bus bar housing may further include a housing flange protruding outwards from side surfaces of the bus bar housing in the leftward and rightward directions. The upper band member may surround an area of the outer member, disposed between the first protruding area and the second protruding area, and an area of a side surface of the bus bar housing, disposed on an upper side of the housing flange.

The upper band member may contact the housing flange.

The battery module may further include an upper cover coupled to an upper side of the bus bar housing assembly.

The bus bar housing assembly may include a bus bar housing formed on side surfaces of the bus bar housing body in the leftward and rightward directions and having a coupling recess having an inwardly recessed shape. The upper cover may include a cover body defining a body of the upper cover, and including an upper surface area and a side surface area extending downwards from an end of the upper surface area. The battery module may further include a cover hook formed on side surfaces of the cover body in the leftward and rightward directions, and protruding inwards in the leftward and rightward directions to be inserted into and coupled to the coupling recess.

The temperature sensing part may be coupled to an upper side of the bus bar body, and the voltage sensing part may be coupled to a lower side of the bus bar body.

A material of the band member may be a metal or a polymer resin.

Other features and aspects will be apparent from the following detailed description, the drawings, and the claims.

BRIEF DESCRIPTION OF THE DRAWINGS

FIGS. 11A to 110 are cross-sectional views illustrating portion A-A, portion B-B, and portion C-C of FIG. 10.

Figure 1:
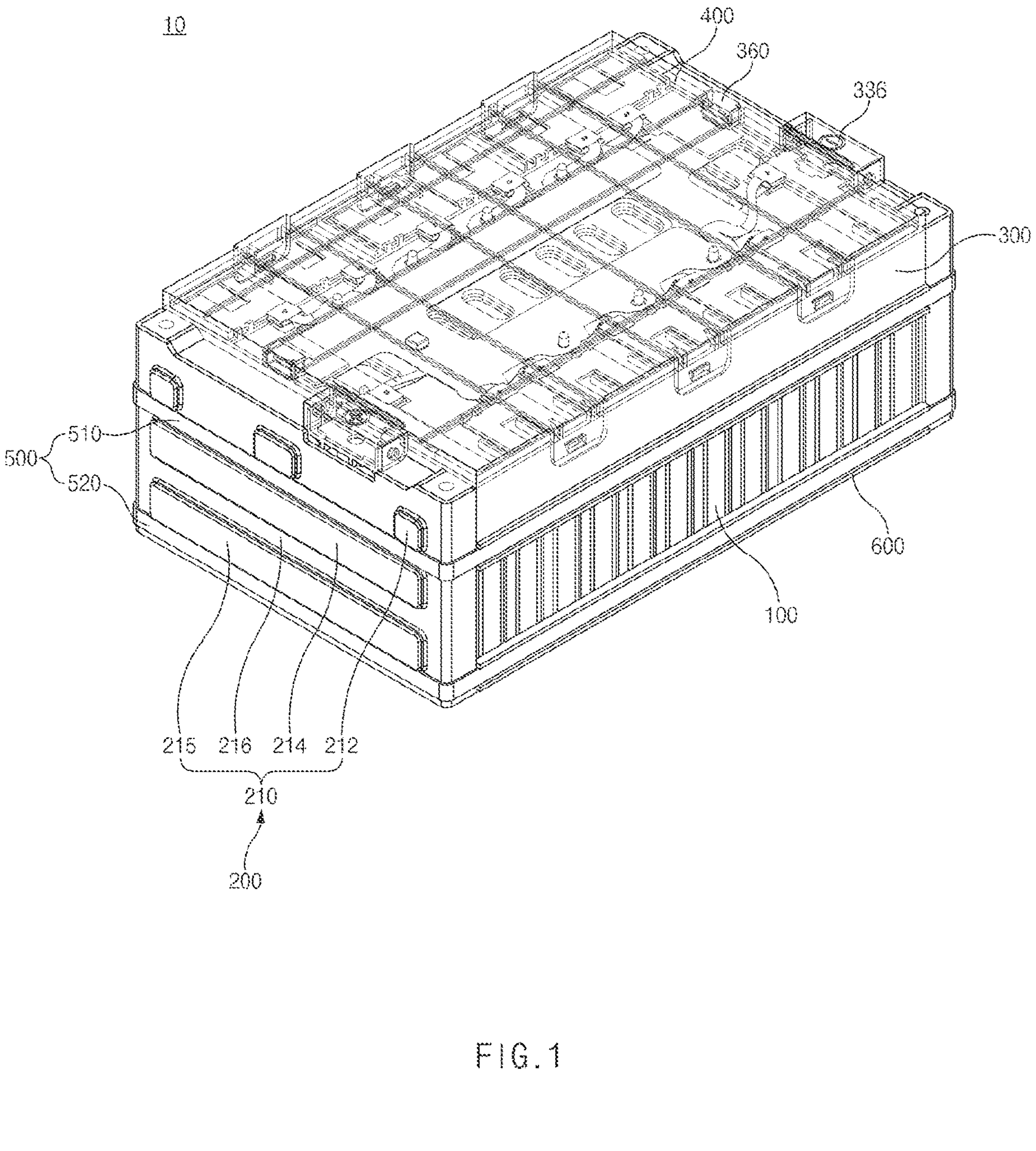
FIG. 1 is a perspective view illustrating a battery module according to the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
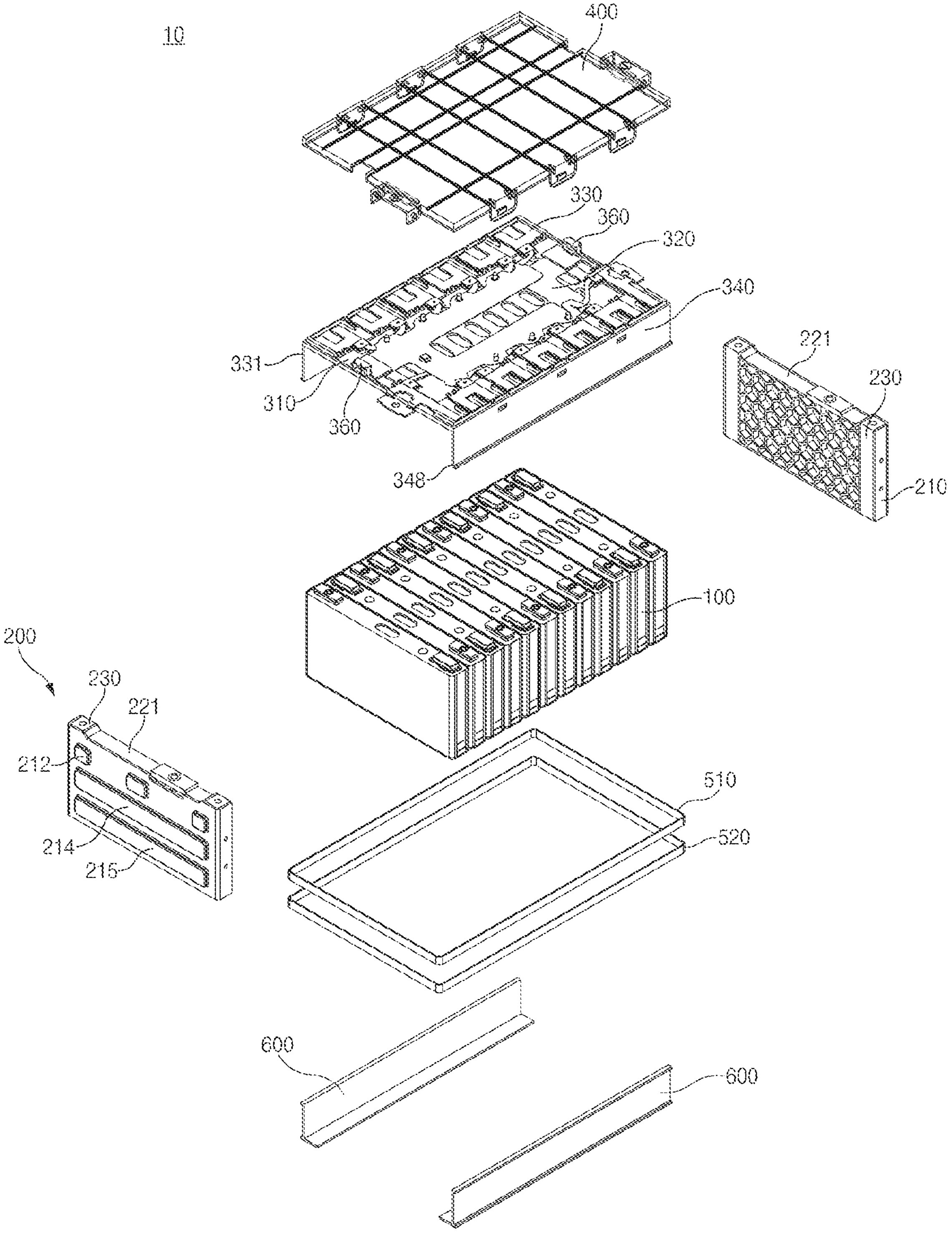
FIG. 2 is an exploded perspective view of a battery module according to the present disclosure.
Figure 3:
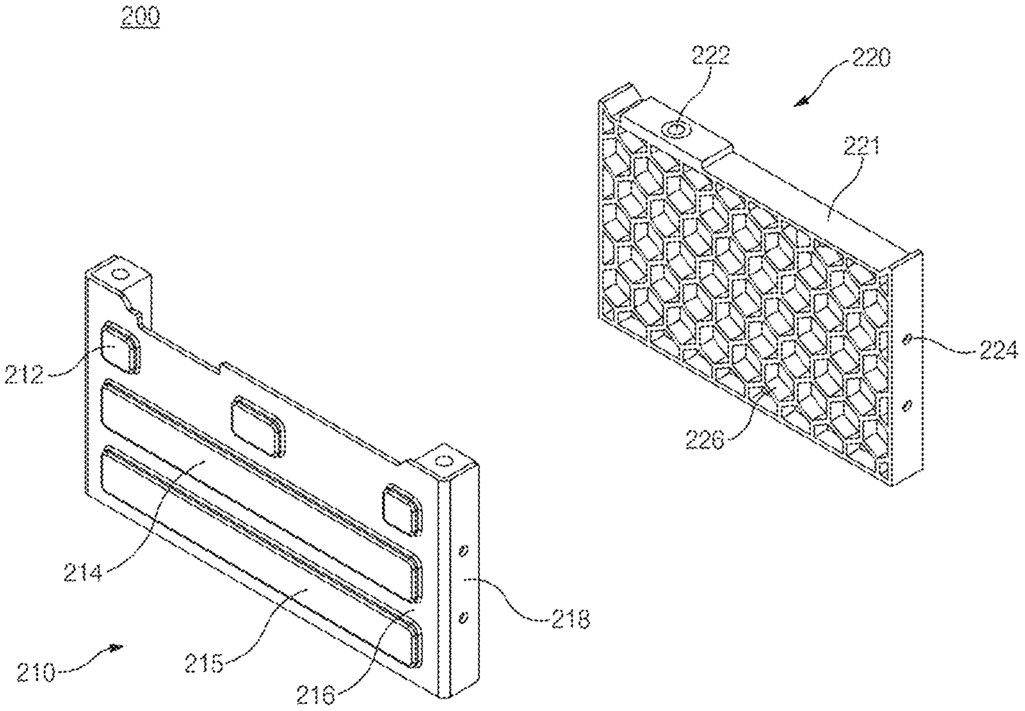
FIG. 3 is a view illustrating a side plate assembly according to the present disclosure.
Figure 4:
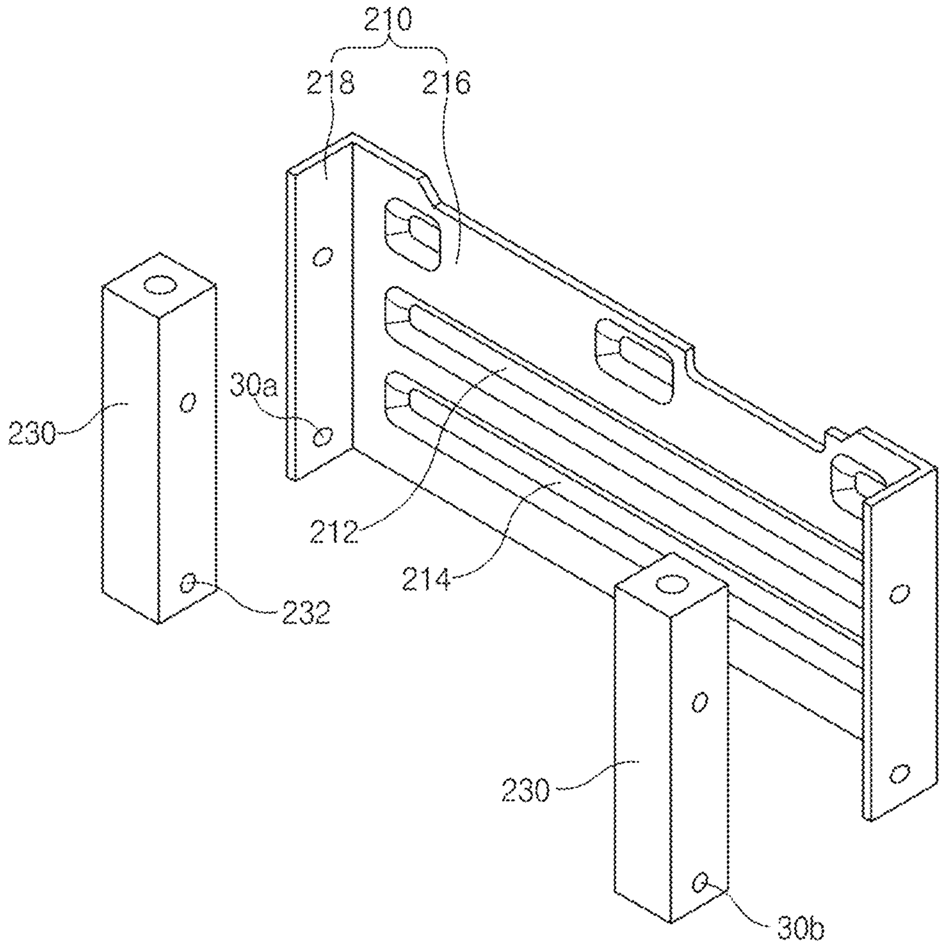
FIG. 4 is a view illustrating an outer member and an outer bushing of the side plate member according to the present disclosure.
Figure 5:
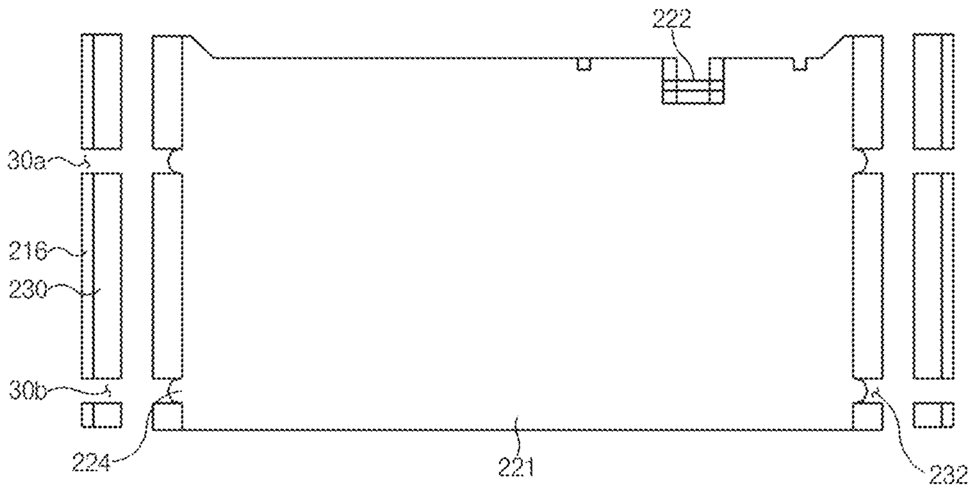
FIG. 5 is a cross-sectional view of a side plate assembly according to the present disclosure.
Figure 6:
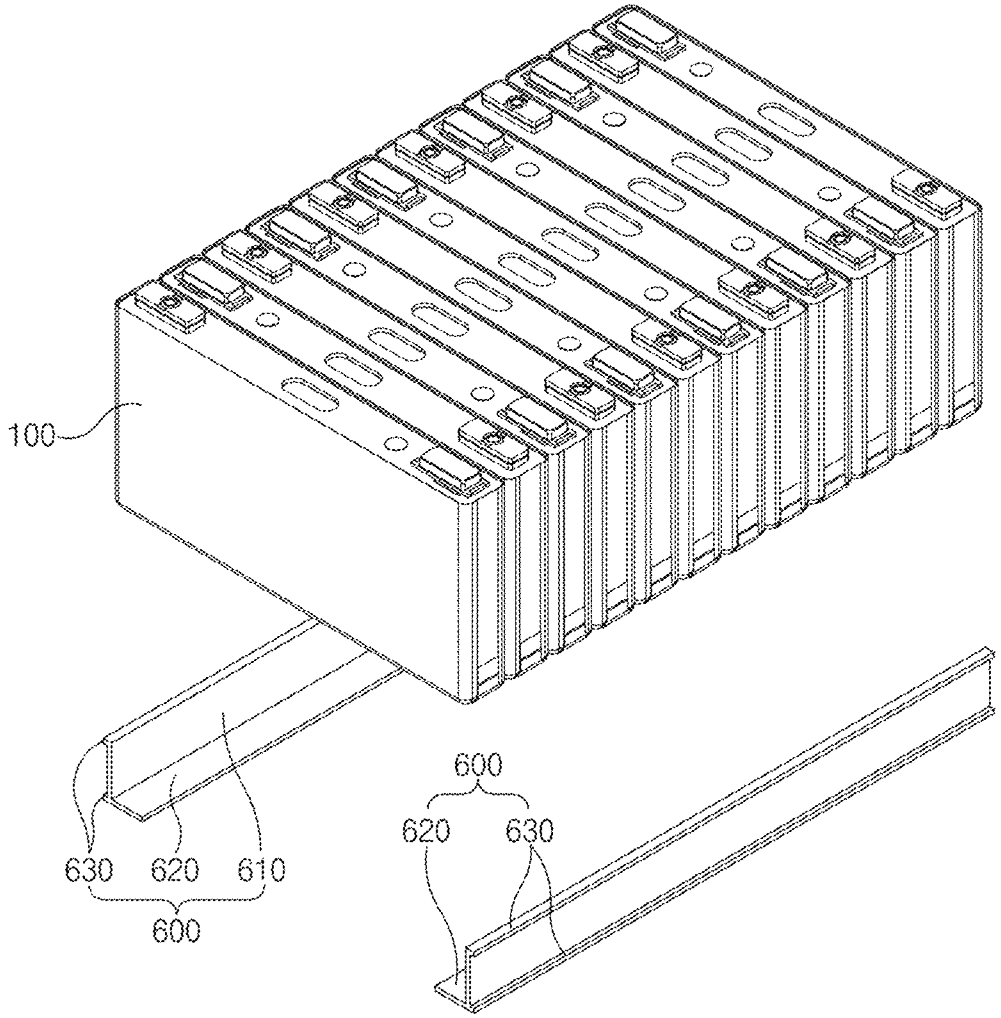
FIG. 6 is a perspective view illustrating a coupling structure of a battery assembly and a lower guide bracket according to the present disclosure.
Figure 7:
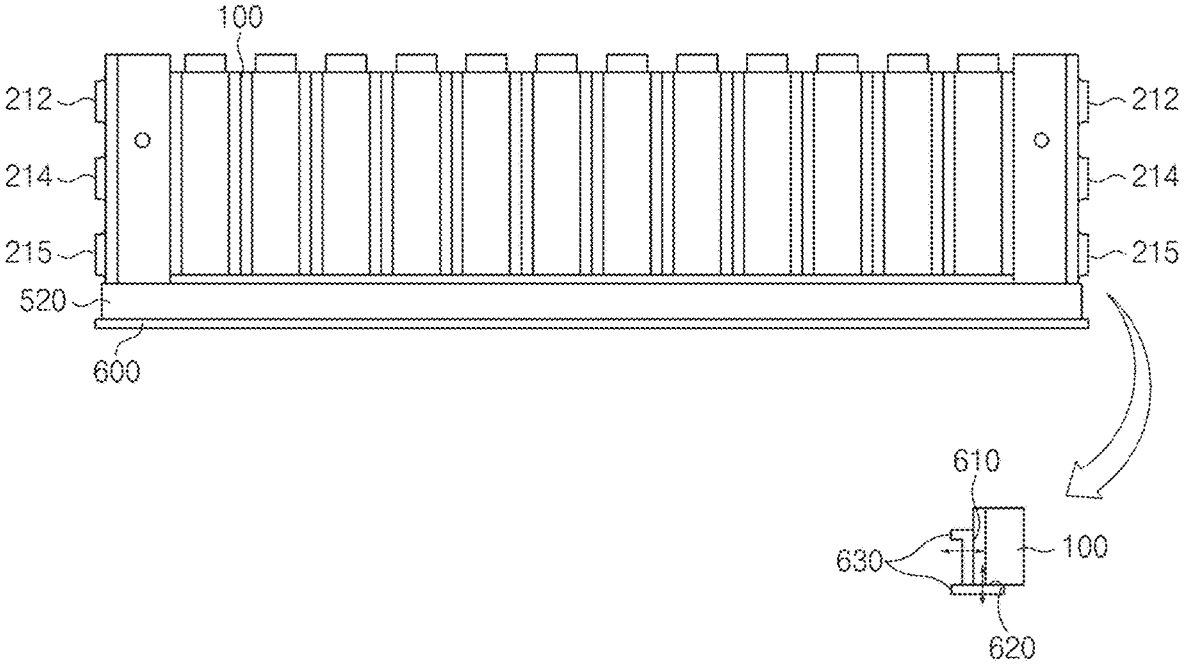
FIG. 7 is a view illustrating a state, in which a lower guide bracket, a side plate assembly, and a band member are coupled to a battery assembly according to the present disclosure.
Figure 8:
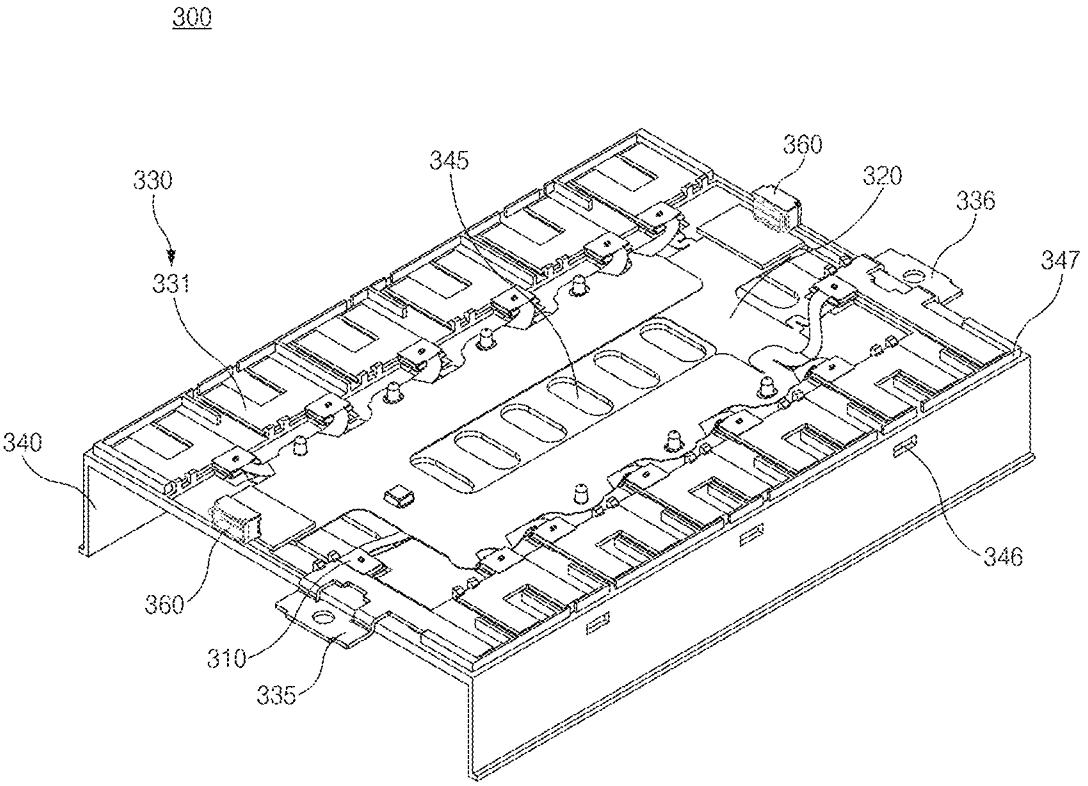
FIG. 8 is a perspective view illustrating a bus bar housing assembly according to the present disclosure.
Figure 9:
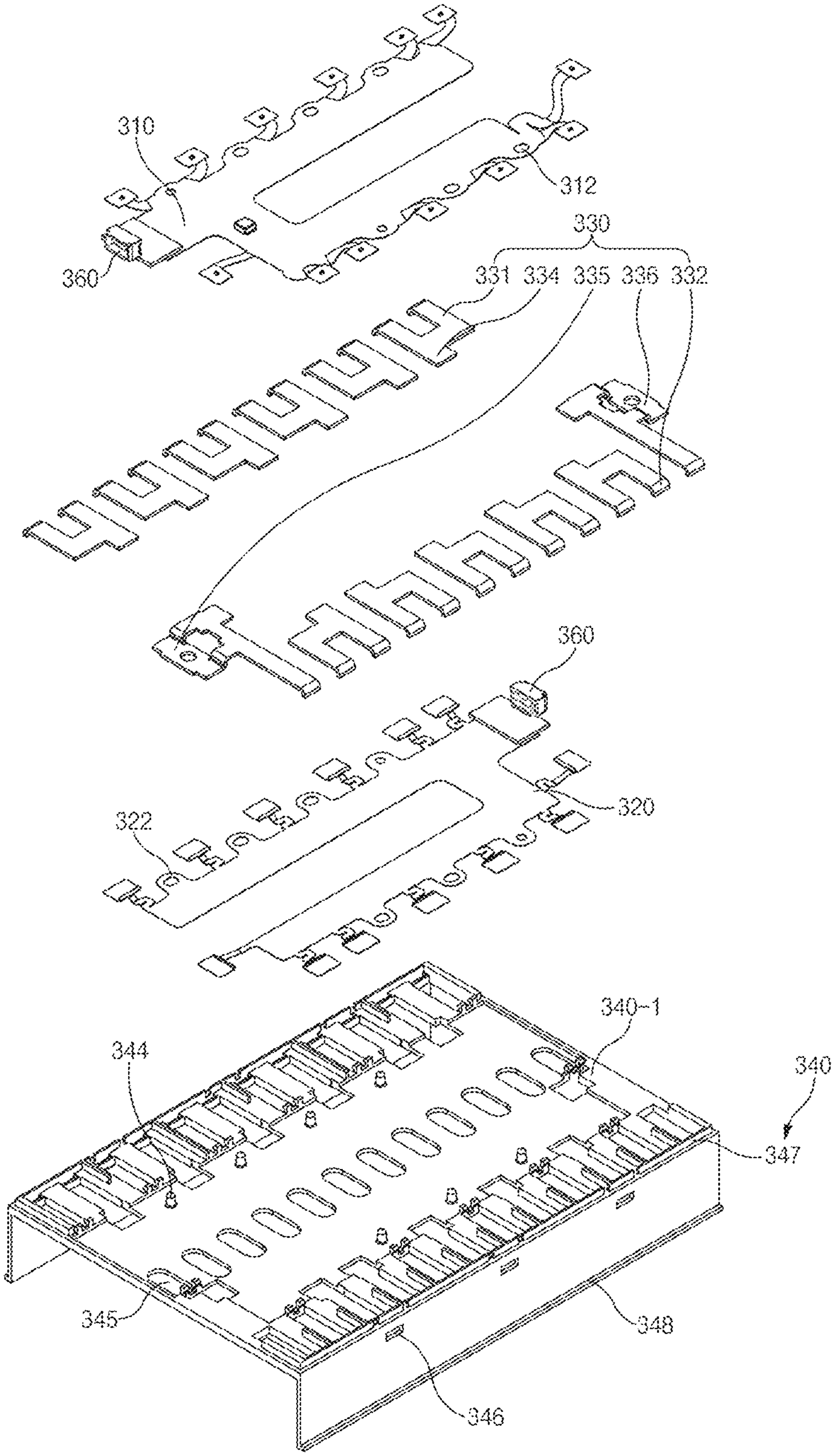
FIG. 9 is an exploded perspective view illustrating a bus bar housing assembly according to the present disclosure.
Figure 10:
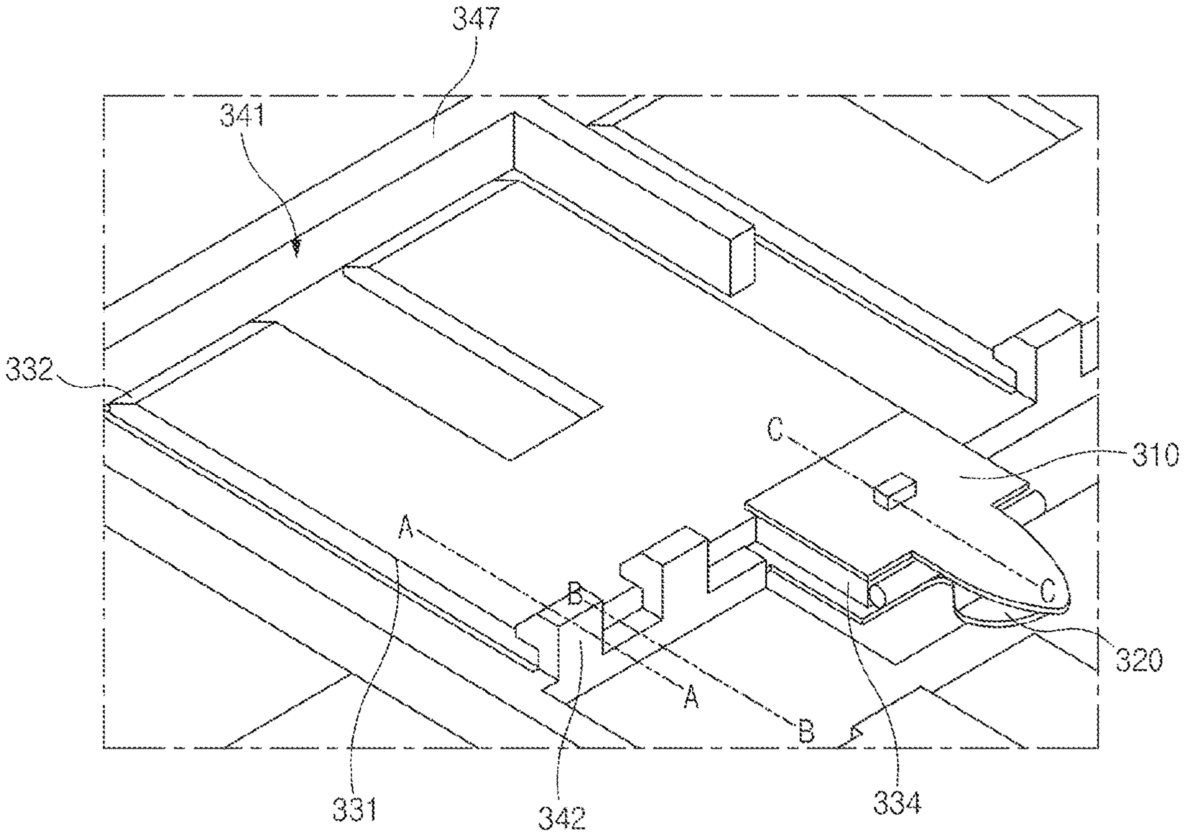
FIG. 10 is a partially enlarged detailed view of a coupling structure of a bus bar and a bus bar housing according to the present disclosure.
Figure 11A:
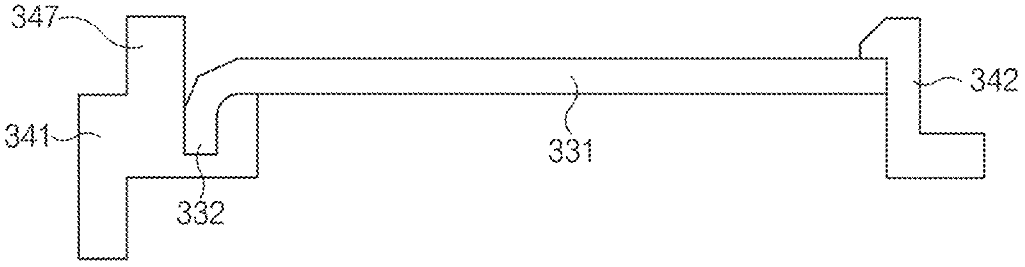
Figure 11B:
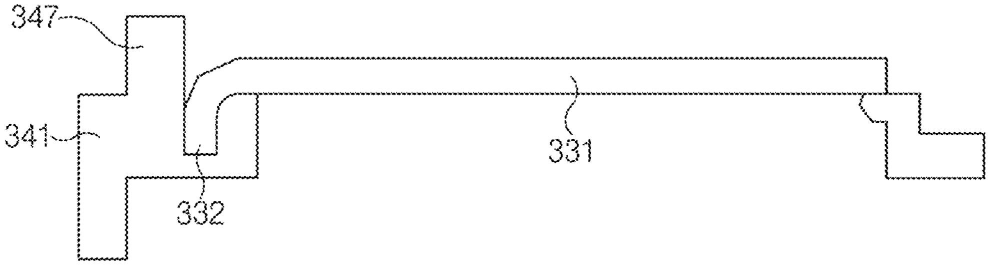
Figure 11C:
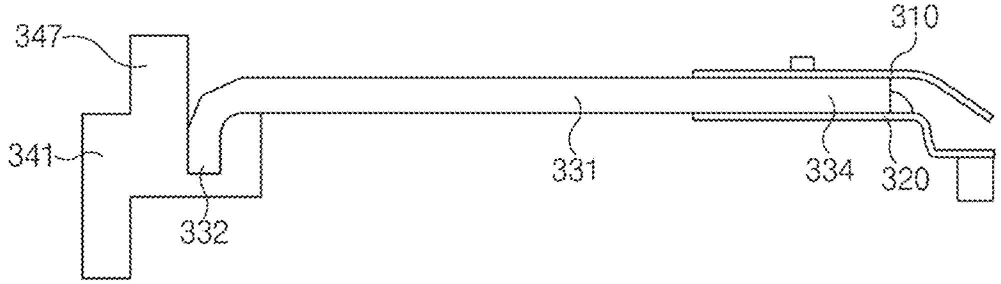
Figure 12:
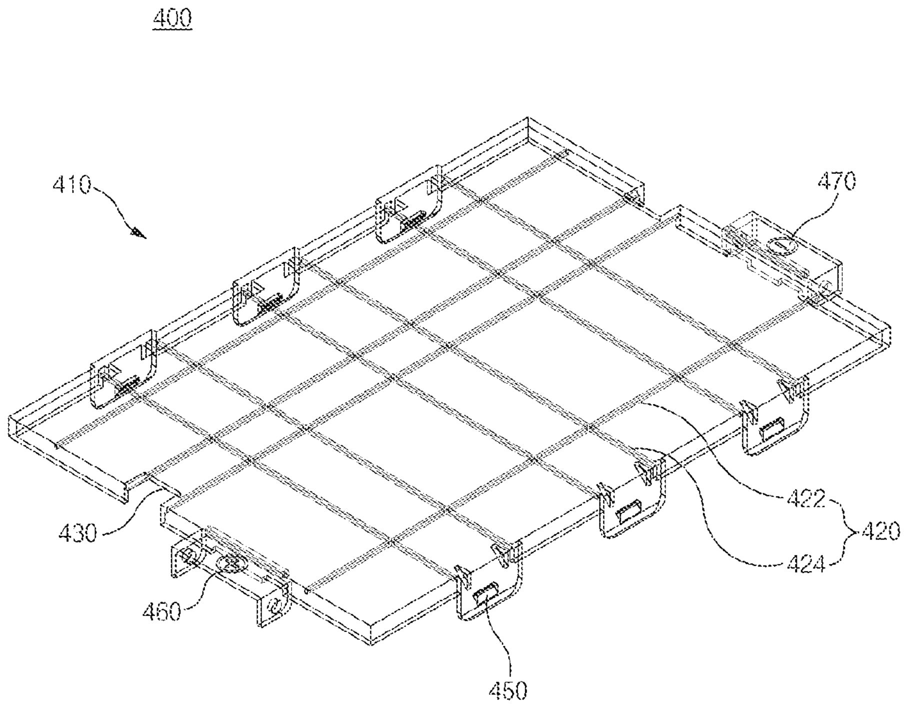
FIG. 12 is a perspective view illustrating an upper cover according to the present disclosure.
Figure 13:
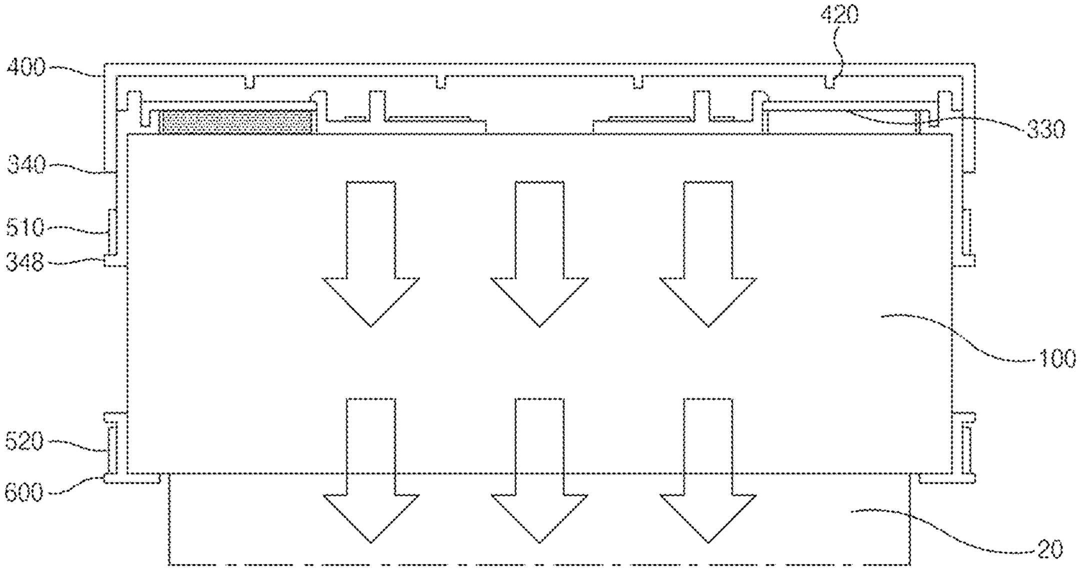
FIG. 13 is a view illustrating a state, in which a lower side of a battery module contacts a cooling passage according to the present disclosure.

FIG. 1 is a perspective view illustrating a battery module according to the present disclosure. FIG. 2 is an exploded perspective view of the battery module according to the present disclosure. FIG. 3 is a view illustrating a side plate assembly according to the present disclosure. FIG. 4 is a view illustrating an outer member and an outer bushing of the side plate member according to the present disclosure. FIG. 5 is a cross-sectional view of the side plate assembly according to the present disclosure. FIG. 6 is a perspective view illustrating a coupling structure of the battery assembly and a lower guide bracket according to the present disclosure. FIG. 7 is a view illustrating a state, in which the lower guide bracket, the side plate assembly, and a band member are coupled to the battery assembly according to the present disclosure. FIG. 8 is a perspective view illustrating a bus bar housing assembly according to the present disclosure. FIG. 9 is an exploded perspective view illustrating the bus bar housing assembly according to the present disclosure. FIG. 10 is a partially enlarged detailed view of a coupling structure of a bus bar and a bus bar housing according to the present disclosure. FIGS. 11A to 110 are cross-sectional views illustrating portion A-A, portion B-B, and portion C-C of FIG. 10. FIG. 12 is a perspective view illustrating an upper cover according to the present disclosure. FIG. 13 is a view illustrating a state, in which a lower side of the battery module contacts a cooling passage according to the present disclosure.

As illustrated in FIGS. 1 to 13, a battery module according to the present disclosure may include a battery assembly 100, a side plate assembly 200, a bus bar housing assembly 300, an upper cover 400, and a band member 500.

A plurality of batteries may be stacked in the battery assembly 100. For example, the battery assembly 100 of the present disclosure may be used for an electric vehicle, but the battery assembly 100 may be used with no limitation. Furthermore, the batteries provided in the battery assembly 100 may be angular batteries, but may be cylindrical batteries or pouch type batteries with no limitation.

Referring to FIGS. 3 to 5, a pair of side plate assemblies 200 may be provided to be located at front and rear ends of the battery assembly 100. In more detail, the side plate assemblies 200 may be adhered to the battery assembly 100 to press the battery assembly 100 in a forward/rearward direction. Accordingly, according to the present disclosure, the batteries provided in the battery assembly 100 may be restrained from being swollen The side plate assembly 200 may include an outer member 210, an inner member 220, and an outer bushing 230.

The outer member 210 may include an outer member body 216 that extends in the leftward/rightward direction (for example, in leftward and rightward directions with respect to an axis (not shown) of the outer member, such as a sagittal axis), and a bending area 218, in which left and right ends of the outer member body 216 are bent inwards in the forward/rearward direction (for example, in forward and rearward directions with respect to the axis of the outer member).

The outer member 210 may include a first protruding area 212, a second protruding area 214, and a third protruding area 215. The first protruding area 212 may be provided in an upper area of the outer member body 216, and may protrude outwards in the forward/rearward direction. The second protruding area 214 may be spaced apart downwards from the first protruding area 212 and may protrude outwards in the forward/rearward direction. The third protruding area 215 may be spaced apart downwards from the second protruding area 214 and may protrude outwards in the forward/rearward direction.

A hole 30*a* may be formed in the bending area 218 of the outer member 210, a hole 30*b* may be formed in the outer bushing 230, and the outer member 210 and the outer bushing 230 may be welded and coupled to each other through the hole formed in the outer member 210 and the hole 30*b* formed in the outer bushing 230. Meanwhile, the outer member 210 may be manufactured through pressing, and may be manufactured of polymer resin-based plastic.

The inner member 220 may be located on an inner side of the outer member 210 in the forward/rearward direction, and may be adhered to the battery assembly 100.

The inner member 220 may include an inner member body 221, an insert nut 222, an assembly boss 224, and an inner member reinforcing rib 226.

The insert nut 222 may be electrically connected to the battery assembly 100, and may be inserted into the inner member body 221. In detail, a positive electrode 335 and a negative electrode 336 of the bus bar 330 may electrically connect the battery assembly 100 to a power demand site (for example, a motor) through an insert nut 222.

The assembly boss 224 may be formed on left and right side surfaces of the inner member body 221 in correspondence to the assembly hole 232 to be coupled to the assembly hole 232 formed in the outer bushing 230.

The inner member reinforcing rib 226 may be provided in an interior of the inner member body 221. In detail, the inner member reinforcing rib 226 may be formed in an interior of the inner member body 221 to have a honeycomb shape to protect the battery assembly 100 from an external impact or to absorb an impact to the battery assembly 100 due to a change in thicknesses of cells due to repeated charging and discharging of the battery. However, the shape of the inner member reinforcing rib 226 is not limited to the honeycomb shape.

The outer bushing 230 may be provided at left and right ends of the inner member 220, and may be fixed to the bending area 218 of the outer member 210. It has been described above that the outer bushing 230 and the outer member 210 may be fixed to each other through welding in the hole 30*a* formed in the outer member 210 and the hole 30*b* formed in the outer bushing 230.

Meanwhile, the outer bushing 230 may include the assembly hole 232 such that the inner member 220 is inserted into an inner portion thereof.

As illustrated in FIGS. 8 to 11, the bus bar housing assembly 300 may surround an upper side of the battery assembly 100.

In more detail, the bus bar housing assembly 300 may include a temperature sensing part 310, a voltage sensing part 320, the bus bar, a bus bar housing 340, and a connector 360.

The temperature sensing part 310 may include a temperature sensor that measures temperature, and a first fixing hole 312 may be formed at a portion thereof. The temperature sensing part 310 may be a configuration for measuring temperatures of the battery assembly 100 and a periphery thereof. That is, it may be identified whether the batteries of the battery assembly 100 are abnormal through the batteries or the peripheral temperature detected through the temperature sensing part 310.

The voltage sensing part 320 may include a pressure sensor that measures pressure, and a second fixing hole 322 may be formed at a portion thereof. In detail, a change in the volumes of the batteries in the battery assembly 100 may be detected through the voltage sensor of the voltage sensing part 320. That is, it may be detected in advance whether the batteries that constitute the battery assembly 100 are discharged or abnormal together with the above-described temperature sensing part 310, by detecting a deformation or a distortion degree of the battery assembly 100 according to a change in the volume of the battery assembly 100 through the voltage sensing part 320.

In detail, the temperature sensing part 310 and the voltage sensing part 320 may include a printed circuit board (PCB). For example, the printed circuit board provided in the temperature sensing part 310 and the voltage sensing part 320 may be a flexible printed circuit board (FPCB).

The voltage sensing part 320 and the bus bar housing 340 may be joined to each other through laser welding. In detail, according to the laser welding, energy density is high, a metal of a high melting point may be welded, welding heat input is very low, a range of directions of heat is narrow, and a heat source is a beam of light, and thus welding may be made in any environment through a transparent material. However, the welding scheme is not limited to the laser welding.

The bus bar 330 may be coupled to the temperature sensing part 310 and the voltage sensing part 320. The bus bar 330 may include a bus bar body 331, a side end bending part 332, and a connecting protrusion part 334. The temperature sensing part 310 may be coupled to an upper side of the bus bar body 331, and the voltage sensing part 320 may be coupled to a lower side of the bus bar body 331. Furthermore, in contrast, the voltage sensing part 320 may be coupled to the upper side of the bus bar body 331, and the temperature sensing part 310 may be coupled to the lower side of the bus bar body 331.

The bus bar body 331 may have a plate shape. A plurality of side end bending parts 332 may have a shape that is bent downwards from left and right ends of the bus bar body 331. As will be described above, the bus bar 330 may be fixed to the bus bar housing 340 through the side end bending parts 332. The connecting protrusion part 334 may protrude inwards in the leftward/rightward direction from left and right ends of the bus bar body 331. The temperature sensing part 310 and the voltage sensing part 320 may be adhered to the connecting protrusion part 334. Accordingly, signals for the temperature and the pressure detected by the temperature sensing part 310 and the voltage sensing part 320 may be transmitted to the bus bar 330.

The bus bar 330 may be coupled to the bus bar housing 340, and the bus bar housing 340 may extend downwards from the left and right ends while surrounding the upper surface of the battery assembly 100, and may surround a side surface of the battery assembly 100.

The bus bar housing 340 may include a bus bar housing body 340-1, a bending part accommodating part 341, and a hook part 342. The bus bar 330 may be coupled to the bus bar housing body 340-1, and the bus bar housing body 340-1 may surround an upper surface of the battery assembly 100. The bending part accommodating part 341 may be formed at left and right ends of the bus bar housing body 340-1, and the side end bending part 332 may be accommodated therein. In more detail, a hole or a recess, into which the side end bending part 332 is inserted, may be formed in the bending part accommodating part 341. The hook part 342 may protrude upwards from a central portion of the bus bar housing body 340-1 toward left and right ends while being bent, and may be adhered to an upper surface and a side surface of the bus bar body 331. That is, the hook part 342 may be a configuration of fixing the bus bar body 331.

That is, the bus bar 330 may be coupled to the bus bar housing 340 while the side end bending part 332 formed in the bus bar body 331 may be stably accommodated in the bending part accommodating part 341 formed in the bus bar housing 340 at the corresponding shape and location. Furthermore, the upper surface of the bus bar body 331 may be adhered and supported through the hook part 342 formed at an upper portion of the bus bar housing 340 whereby separation of the bus bar 330 may be prevented and may be stably fixed to the bus bar housing 340.

The bus bar housing 340 may further include a fixing boss 344, a gas discharge hole 345, a partition wall 347, and a housing flange 348. The fixing boss 344 may protrude upwards from the bus bar housing body 340-1 to be coupled to the temperature sensing part 310 and the first fixing hole 312 and the second fixing hole 322 of the voltage sensing part 320.

A plurality of gas discharge holes 345 may be provided at a central area in the left and right direction on an upper side of the bus bar housing body 340-1 to discharge the gas discharged from the battery assembly 100, and may be formed along the forward/rearward direction. In detail, the gas discharge hole 345 may prevent discharging due to overheating of the battery assembly 100 by promptly discharging the heat emitted due to use of the battery assembly 100 to an outside whereby a lift span of the battery may be extended and ignition may be prevented. In more detail, a plurality of gas discharge holes 345 may be provided along a direction, in which the batteries provided in the battery assembly 100 are stacked.

The partition wall 347 may protrude upwards from the left and right ends of the bus bar housing body 340-1. Furthermore, the housing flange 348 may protrude outwards from the left and right side surfaces thereof. In detail, the partition wall 347 is a configuration for protecting the temperature sensing part 310, the voltage sensing part 320, and the bus bar 330 from an outside, and may protrude upwards from the left and right ends of the bus bar housing body 340-1 at a preset height.

The bus bar housing 340 may include a coupling recess 346 that is formed on left and right side surfaces of the bus bar housing assembly 300 and has an inwardly recessed shape. In detail, the bus bar housing assembly 300 may be fixed to the upper cover 400 through coupling of the bus bar housing 340 including the coupling recess 346 that is formed on the left and right side surfaces of the bus bar housing assembly 300 and has the inwardly recessed shape and the upper cover 400 including the cover hook 450 that is formed on the left and right side surfaces of the cover body 410, which will be described below and protrudes inwards in the leftward/rightward direction to be inserted into and coupled to the coupling recess 346. Accordingly, because the bus bar housing assembly 300 may be protected from an outside, an unnecessary electrical connection between the battery assembly 100 and an external configuration may be prevented.

Meanwhile, the connector 360 may pass through a through-recess 430 and may be fixed to the bus bar housing 340. In detail, the connector 360 may be a configuration for delivering signal values measured by the temperature sensing part 310 and the voltage sensing part 320 to an outside.

As illustrated in FIG. 12, the upper cover 400 may be coupled to an upper side of the bus bar housing assembly 300. As described above, the upper cover may be a configuration for protecting the bus bar housing assembly 300 from an outside.

The upper cover 400 may include a cover body 410, a reinforcing rib 420, and a through recess 430. The cover body 410 may define a body of the upper cover 400, and may include an upper surface area and a side surface area that extends downwards from an end of the upper surface area. In detail, the cover body 410 may be coupled while the upper surface area of the cover body 410 surrounds an upper side of the bus bar housing assembly 300 and the side surface area thereof surrounds the side surface area of the bus bar housing assembly 300 including the partition wall 347 of the bus bar housing assembly 300.

The reinforcing rib 420 may include a first reinforcing rib 422 that protrudes downwards from the upper surface area of the cover body 410 and extends in the forward/rearward direction, and a second reinforcing rib 424 that extend in a direction that crosses the forward/rearward direction. In detail, the reinforcing rib 420 may prevent deformation of the battery assembly 100 by reinforcing the battery assembly 100 in the forward/rearward direction and the crossing direction thereof through the first reinforcing rib 422 that is formed on an inner side of the cover 410 while crossing it to reinforce the cover body 410 in the forward/rearward direction, and the second reinforcing rib 424 that reinforces the cover body 410 in the direction that crosses the first reinforcing rib 422.

The through recess 430 may be formed in the upper surface area of the cover body 410 and may have an upwardly recessed shape. As described above, the connector 360 may pass through the through recess 430 to be fixed to the bus bar housing 340 to various signals, such as a voltage and a temperature of the battery assembly 100, to an outside.

The upper cover 400 may further include a cover hook 450, a positive engraved part 460, and a negative engraved part 470. The cover hook 450 may be formed on the left and right side surfaces of the cover body 410 and may protrude inwards in the leftward/rightward direction to be inserted into and coupled to the coupling recess 346 formed in the bus bar housing 340. The positive electrode engraved part 460 may be formed in an area that faces the positive terminal 335 of the bus bar housing assembly 300 and a plus (+) shape may be engraved. The negative electrode engraved part 470 may be formed in an area that faces the negative terminal 336 of the bus bar housing assembly 300 and a minus (−) shape may be engraved. The positive engraved part 460 and the negative engraved 470, which have described above, may be configurations for easily recognizing polarities of the terminals from an outside by the user.

As illustrated in FIGS. 6 and 7, the battery module 10 according to an embodiment of the present disclosure may further include a lower guide bracket 600.

A pair of lower guide bracket 600 may be coupled while lower ends of the battery assembly 100 in the leftward/rightward direction are seated on an inside thereof.

The lower guide bracket 600 may include a first area 610, a second area 620, and a third area 630. The first area 610 may be adhered to a side surface of the battery assembly 100. The second area 620 may be bent from the first area 610 to be adhered to a lower surface of the battery assembly 100. The third area 630 may protrude from the upper and lower ends of the area 610 on an outside in the leftward/rightward direction.

As illustrated in FIGS. 1 and 2, the band member 500 may be configured to surround the pair of side plate assemblies 200 and the battery assembly 100 to fasten the battery assembly 100 and the side plate assemblies 200.

The band member 500 may include an upper band member 510 and a lower band member 520.

The upper band member 510 may be configured to surround the battery assembly 100, the pair of side plate assemblies 200, and the bus bar housing assembly 300 to fasten the battery assembly 100, the pair of side plate assemblies 200, and the bus bar housing assembly 300.

The upper band member 510 may be configured to surround an area of the outer member 210, which is formed between the first protruding area 212 and the second protruding area 214 and an area of a side surface of the bus bar housing 340, which is formed at an upper portion of the housing flange 348. The upper band member 510 may be configured to contact the housing flange 348.

A material of the band member 500 may be a metal or a polymer resin. In detail, the band member 500 may be manufactured of a light metal, such as aluminum or an aluminum alloy, which has durability and elasticity, or a polymer resin that has durability and an excellent elasticity. The kinds of the polymer resin include a phenol resin, a polyurethane resin, a polyimide resin, an acryl resin, an urea/melanin resin, and a silicon resin.

The lower band member 520 may be configured to surround the battery assembly 100, the pair of side plate assemblies 200, and the lower guide bracket 600 to fasten the battery assembly 100, the pair of side plate assemblies 200, and the lower guide bracket 600.

The lower band member 520 may be configured to surround an area of the outer member 210, which is formed between the second protruding area 214 and the third protruding area 215, and an area of the first area 610 of the lower guide bracket 600, which is located between the pair of third areas 630.

As described above, according to the present disclosure, the configurations of the battery module 10 may be firmly fixed by fastening the side surface of the battery assembly 100 in upper and lower areas of the battery module 10 by using the upper band member 510 and the lower band member 520. Accordingly, the battery assembly 100 may be fastened while not using a separate subsidiary member, such as a case or a housing, in which a battery assembly 100 is accommodated whereby manufacturing performance is excellent and manufacturing time and costs may be reduced.

Furthermore, because a portion of the battery assembly 100, to which the band member 500 according to the present disclosure is always exposed to an outside, heat of the battery assembly 100 may be advantageously emitted whereby deformation or distortion of the battery due to heat may be prevented, and because a fire or an explosion due to emission of heat of the battery may be prevented, a life span of the battery may be extended by enhancing the durability of the battery as well.

In more detail, according to the present disclosure, because a lower area of the battery assembly 100 provided in the battery module 10 may directly contact a refrigerant that flows through the cooling passage 20, the heat emitted from the battery assembly may be cooled promptly and effectively.

Figure 14:
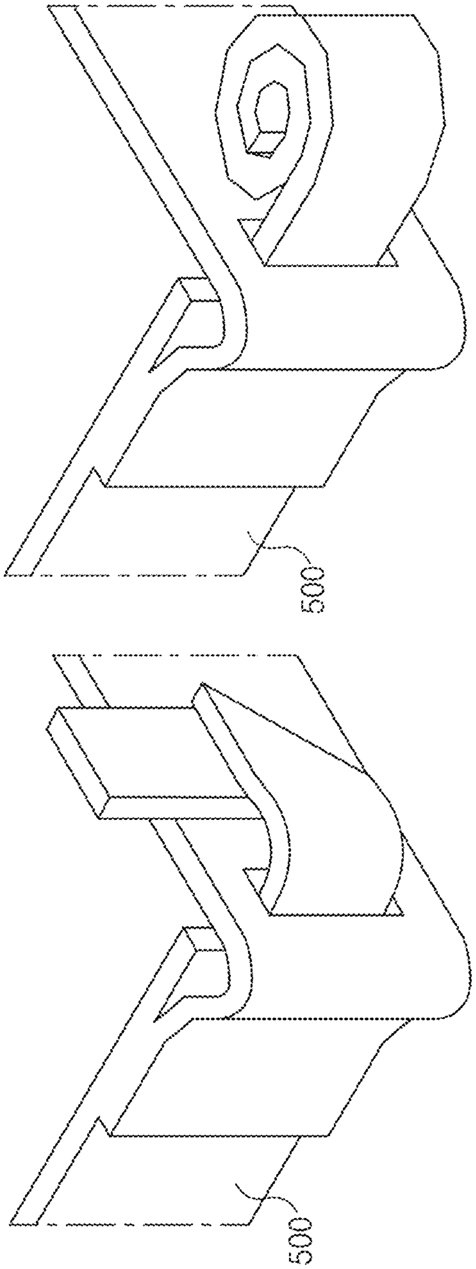
FIG. 14 is a view illustrating a first example, in which a band member is coupled, according to the present disclosure.
Figure 15:
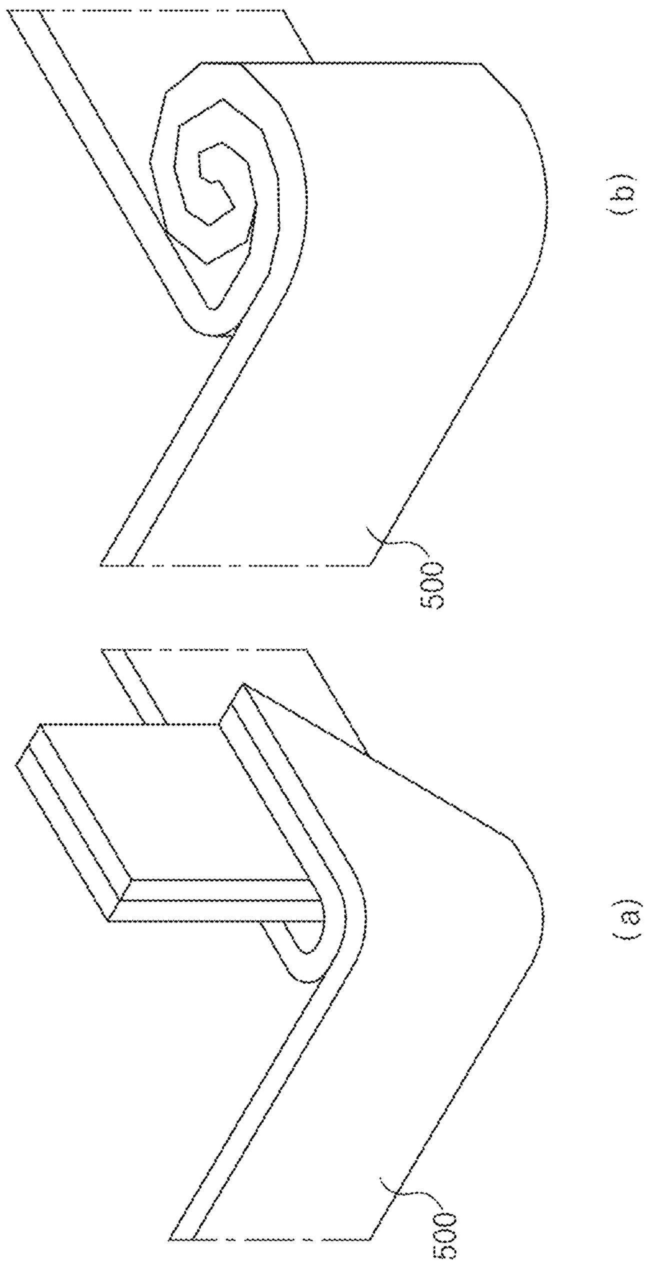
FIG. 15 is a view illustrating a second example, in which a band member is coupled, according to the present disclosure.

FIG. 14 is a view illustrating a first example, in which the band member is coupled, according to the present disclosure. FIG. 15 is a view illustrating a second example, in which a band member is coupled, according to the present disclosure.

As illustrated in FIG. 14, in the battery module 10 according to the present disclosure, a hole may be formed at one end in a lengthwise direction, in which the band member 500 extends, and an opposite end thereof in the lengthwise direction may be inserted and coupled to the hole. Alternatively, as illustrated in FIG. 15, in the battery module 10 according to the present disclosure, an opposite end of the band member 500 may have a bent or rolled shape. In detail, the hole is formed at the end in the lengthwise direction, in which the band member 500 extends, and the opposite end thereof in the lengthwise direction is inserted into and coupled to the hole, and opposite ends of the band member 500 may be coupled to each other to be finished as the opposite end passes the hole at the one end and the opposite end is bent or rolled. Then, when the opposite end of the band member 500 is bent, it may be bent only once or two times or more to be coupled.

Furthermore, in the battery module 10 according to the present disclosure, opposite ends in a lengthwise direction, in which the band member 500 extends, may be attached to each other and may have bent or rolled shapes. In detail, the opposite ends of the band member 600 in the lengthwise direction, in which the band member 600 extends, are bent or rolled while being adhered to each other, and in this case, the adhered opposite ends may be finished while being bent or rolled to be coupled. Then, when the opposite end of the band member 500 is bent, it may be bent only once or two times or more to be coupled.

According to the present disclosure, a design may be standardized through enhancement of cooling performance and enhancement of a degree of freedom of disposition of a cooling layout by employing a scheme of directly cooling a lower end of the battery assembly.

Furthermore, a weight, costs, and a volume of the battery assembly may be reduced and an energy density per weight may be enhanced by directly cooling the lower end of the battery assembly while not applying an additional heat exchange member such as a heat plate.

Furthermore, the battery module may be standardized through securement of a degree of freedom of series or parallel stack of the batteries accommodated in the battery module and expansion of the shape of the battery assembly may be secured.

Furthermore, the battery assembly may be stably fixed and the weight and costs of the battery assembly may be reduced while swelling is prevented, through application of the band member.

Furthermore, schemes of some parts may be changed from extrusion of aluminum to pressing, or a light weight and an excellent insulation performance may be secured through application of plastic.

Various embodiments of the present disclosure do not list all available combinations but are for describing a representative aspect of the present disclosure, and descriptions of various embodiments may be applied independently or may be applied through a combination of two or more.

An aspect of the present disclosure provides a battery module, in which a cooling performance may be enhanced and a degree of freedom of disposition of a cooling layout may be enhanced by directly cooling battery cells through a lower end of the battery module.

Another aspect of the present disclosure provides a battery module, in which battery cells may be directly cooled while not adding a separate heat exchange device to cool heat generated in a battery.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery module comprising:

a battery assembly, in which a plurality of batteries are stacked; and a bus bar housing assembly configured to surround an upper side of the battery assembly, wherein the bus bar housing assembly includes:

a temperature sensing part including a temperature sensor, a first fixing hole formed therein, the temperature sensor being configured to measure temperature;

a voltage sensing part including a pressure sensor, a second fixing hole formed therein, the pressure sensor being configured to measure pressure;

a bus bar including a bus bar body, a plurality of side end bending parts bent downwards from one end of the bus bar body in one of the leftward and rightward directions and a connecting protrusion part from the bus bar body, the temperature sensing part and the voltage sensing part being adhered to the connecting protrusion part; and a bus bar housing, coupled to the bus bar, surrounding an upper surface of the battery assembly, and extending downwards from opposite ends in leftward and rightward directions to surround a side surface of the battery assembly, wherein the bus bar housing includes:

a bus bar housing body, the bus bar coupled thereto, surrounding an upper surface of the battery assembly;

bending part accommodating parts disposed at opposite ends of the bus bar housing body in the leftward and rightward directions, and in which the plurality of side end bending parts is accommodated; and a hook part protruding upwards while being bent from a central portion of the bus bar housing body toward an end thereof in one of the leftward and rightward directions, and adhered to an upper surface and a side surface of the bus bar body.

2. The battery module of claim 1, wherein the bus bar housing further includes:

a fixing boss protruding upwards from the bus bar housing body, configured to be coupled to the first fixing hole of the temperature sensing part and the second fixing hole of the voltage sensing part; and a plurality of gas discharge holes provided in a central area in the one of the leftward and rightward directions on an upper side of the bus bar housing body to discharge a gas discharged from the battery assembly and formed in at least one of forward and rearward directions.

3. The battery module of claim 1, wherein the voltage sensing part and the bus bar housing are joined to each other through laser welding.

4. The battery module of claim 3, wherein the bus bar housing further includes:

a partition wall protruding upwards from an end of the bus bar housing body.

5. The battery module of claim 1, further comprising:

a pair of side plate assemblies, located at opposite ends of the battery assembly in forward and rearward directions, configured to press the battery assembly; and a band member configured to surround the pair of side plate assemblies and the battery assembly to fasten the battery assembly and the side plate assemblies.

6. The battery module of claim 5, wherein the band member includes:

an upper band member configured to surround and fasten the battery assembly, the pair of side plate assemblies, and the bus bar housing assembly.

7. The battery module of claim 6, wherein the side plate assemblies includes:

an outer member including an outer member body extending in the leftward and rightward directions, and a bending area, in which opposite ends of the outer member body in the forward and rearward directions are bent inwards in the forward and rearward directions, wherein the outer member includes:

a first protruding area protruding outwards in an upper area of the outer member body; and a second protruding area spaced apart from the first protruding area downwards and protruding outwards, wherein the bus bar housing further includes:

a housing flange protruding outwards from side surfaces of the bus bar housing in the leftward and rightward directions, and wherein the upper band member is configured to surround an area of the outer member, disposed between the first protruding area and the second protruding area, and an area of a side surface of the bus bar housing, disposed on an upper side of the housing flange.

8. The battery module of claim 7, wherein the upper band member is configured to contact the housing flange.

9. The battery module of claim 5, wherein a material of the band member is a metal or a polymer resin.

10. The battery module of claim 1, further comprising:

an upper cover coupled to an upper side of the bus bar housing assembly.

11. The battery module of claim 10, wherein the bus bar housing assembly includes:

a bus bar housing formed on side surfaces of the bus bar housing body in the leftward and rightward directions and having a coupling recess having an inwardly recessed shape, wherein the upper cover includes:

a cover body defining a body of the upper cover, and including an upper surface area and a side surface area extending downwards from an end of the upper surface area, and wherein the battery module further includes a cover hook formed on side surfaces of the cover body in the leftward and rightward directions, and protruding inwards in the leftward and rightward directions to be inserted into and coupled to the coupling recess.

12. The battery module of claim 1, wherein the temperature sensing part is coupled to an upper side of the bus bar body, and the voltage sensing part is coupled to a lower side of the bus bar body.

* * * * *